Feb. 14, 1967   W. E. RHODES   3,303,708
BLADE ACTUATOR AND SUPPORTING BRACKET FOR SWITCHES AND THE LIKE
Filed Jan. 26, 1965   2 Sheets-Sheet 2
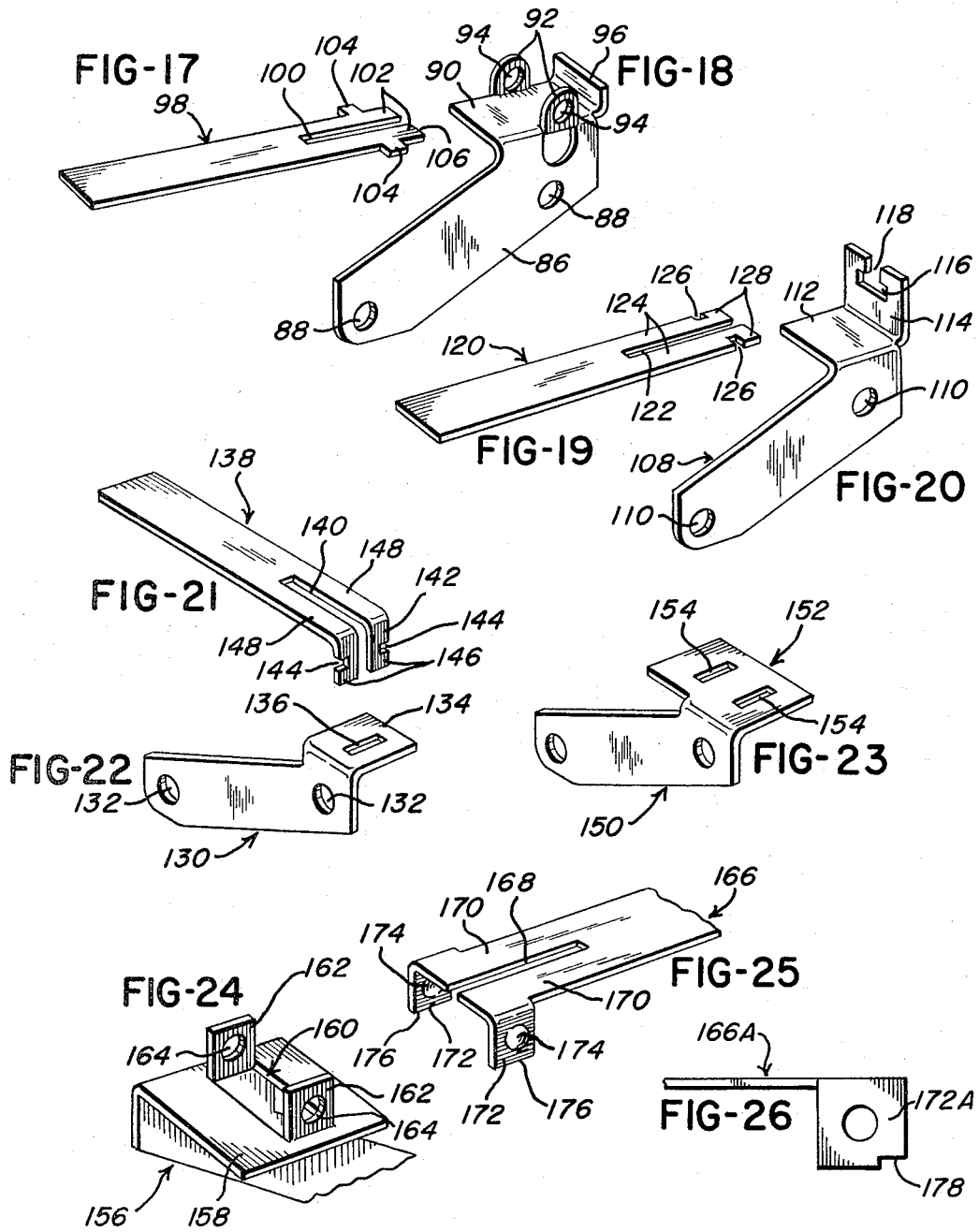
INVENTOR.
WILLIAM E. RHODES
BY
Candor & Candor
HIS ATTORNEYS United States Patent Office 3,303,708
Patented Feb. 14, 1967

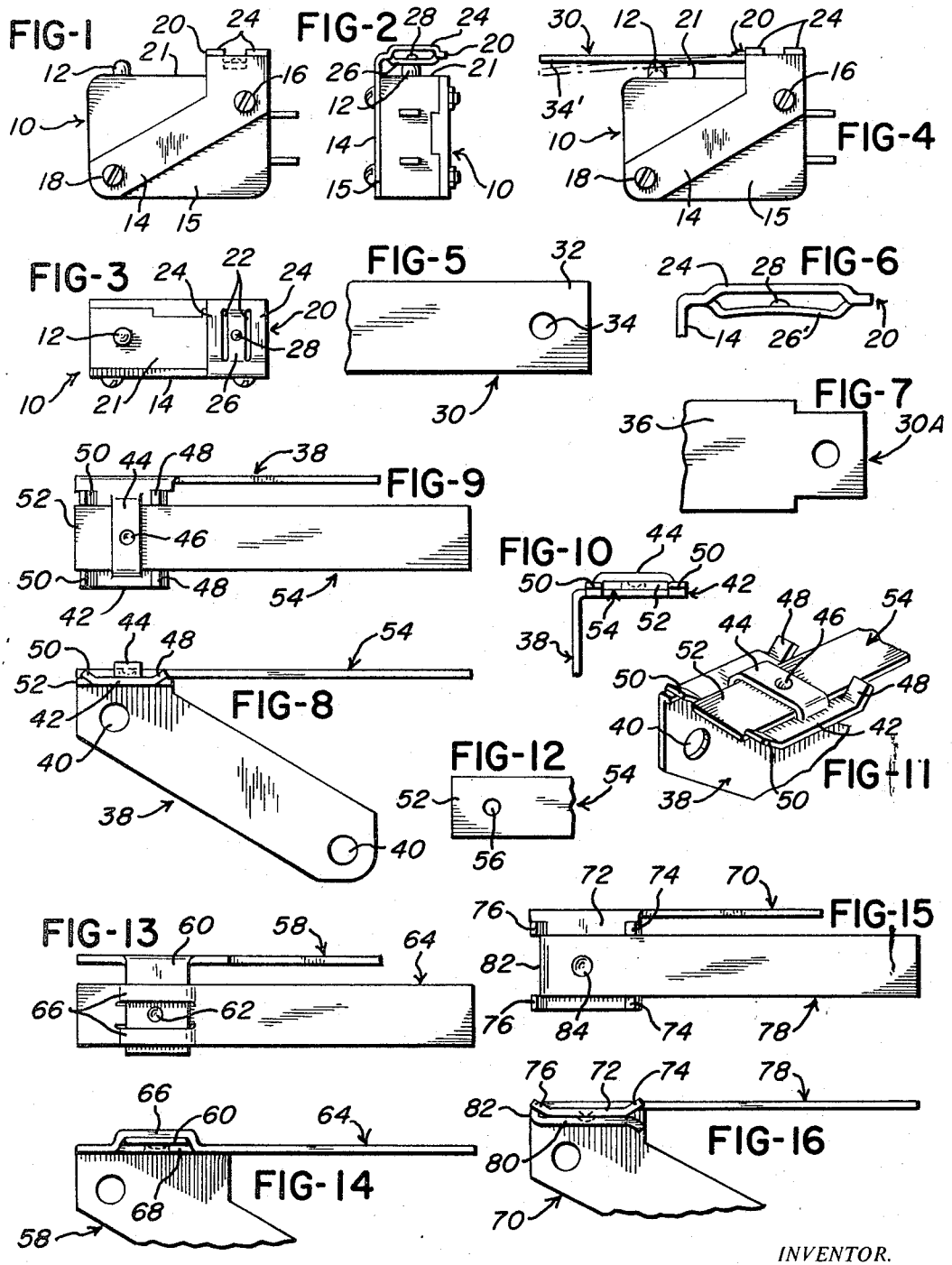

3,303,708
BLADE ACTUATOR AND SUPPORTING BRACKET FOR SWITCHES AND THE LIKE
William E. Rhodes, Columbus, Ohio, assignor to Robertshaw Controls Company, Richmond, Va., a corporation of Delaware
Filed Jan. 26, 1965, Ser. No. 428,173
17 Claims. (Cl. 74—104)

This invention relates to a blade actuator and a supporting bracket for switches and the like.

One of the features of this invention includes the use of a flat sheet metal bracket at the side of the switch casing with an integral, sheet metal top supporting side arm to extend over another side of the switch casing. This supporting side arm may be provided with an attaching construction to which a blade actuator may be attached to actuate a switch plunger which extends out of the switch casing. The construction is such that the bracket with its supporting side arm may be efficiently made. The blade actuator may be separately made and then may be easily attached to the side arm.

Other features are apparent from this description, the appended claimed subject matter, and/or the accompanying drawings in which:

FIGURE 1 is a side elevation of a switch with a mounting side bracket according to this invention.

FIGURE 2 is an end view of the mounting side bracket from the right end of FIGURE 1.

FIGURE 3 is a top view of FIGURE 2.

FIGURE 4 is a view similar to FIGURE 1, but showing the actuating spring blade inserted in the side bracket.

FIGURE 5 is a top view of the actuating spring blade.

FIGURE 6 is an enlarged view of a portion of FIGURE 2, but showing a slightly modified form.

FIGURE 7 shows a modified form of the actuating spring blade.

FIGURE 8 is an elevation of a modified mounting side bracket and an actuating spring blade which may be attached to a switch casing similar to that shown in FIGURE 1, but with FIGURE 8 showing the opposite side of the mounting side bracket.

FIGURE 9 is a top view of FIGURE 8.

FIGURE 10 is an end view from the left end of FIGURE 9.

FIGURE 11 is a perspective view of a portion of FIGURE 9.

FIGURE 12 is a top view of a portion of the actuating blade of FIGURE 9.

FIGURE 13 is a top view, similar to FIGURE 9, but showing a further modified form of the invention.

FIGURE 14 is a side view of a portion of the embodiment of FIGURE 13.

FIGURE 15 is a top view, similar to FIGURE 9, of another embodiment.

FIGURE 16 is a side view of a portion of FIGURE 15.

FIGURE 17 is a perspective view of an actuating blade to be used with the bracket of FIGURE 18.

FIGURE 18 is a perspective view of a side bracket to be used with FIGURE 17.

FIGURE 19 is a perspective view of another embodiment of a blade for use with FIGURE 20.

FIGURE 20 is a view of a side bracket for use in FIGURE 19.

FIGURE 21 is a perspective view of another embodiment of a blade for use with FIGURE 22.

FIGURE 22 is a view of a bracket for use with FIGURE 21.

FIGURE 23 is a view similar to FIGURE 22 but showing another embodiment of the mounting side bracket.

FIGURE 24 is a perspective view of another embodiment of a mounting side bracket.

FIGURE 25 is a perspective view of an actuating blade to be used with FIGURE 24.

FIGURE 26 is a side view of a modified form of the actuating blade of FIGURE 25.

Certain words may be used in the specification and claims which indicate direction, relative position, etc. Such words are used for the sake of clearness and brevity. However, it is to be understood that such words apply only to the direction, relative position, etc., as shown in the drawings, and that in the actual embodiments of the invention such direction, relative position, etc., may be entirely different. Examples of such words are 'vertical,' "horizontal," "upper," "lower," "leftward," "rightward," etc.

In FIGURES 1–5 a switch 10 is shown in elevation. This may be a relatively small switch, having a plunger 12 which actuates a snap switch mechanism or construction within the switch casing 10, of well known construction. If desired, the casing 10 may be of substantially rectangular shape, for example, a substantially right angled parallelepiped, approximately 1 inch long, ⅝ inch wide and ⅜ inch thick, with slightly rounded corners. The casing may be made of plastic, such as Bakelite and the like. However, other materials, sizes and shapes may be used. A flat, sheet metal supporting bracket 14 is secured to one side 15 of the switch 10 by means of screws passing through the openings 16 and 18, which may pass through the entire side walls of the casing 10 to receive screws which pass through such openings 16 and 18 and which may be secured to a switch support to support the entire switch on, against or along a flat part of such support, if desired.

The switch casing 10 may be of well known construction and, for example, may be somewhat similar to that shown in the patent to Roeser, 2,594,216, patented April 22, 1952, with any well known switch construction in the casing. Such casing may have enlarged corners where the openings 16 and 18 are shown in this application through which the screws pass. The enlarged corners may be at diagonally opposite corners of the casing with the plunger 12 extending out of the casing adjacent another corner, as shown in FIGURES 1 and 4 of this application. Such enlarged corners may be similar to the enlarged corner of FIGURE 1 of said Roeser patent through which the Roeser screw 12 passes.

The bracket 14 may be secured to the casing 10 on the same side as the cover of the casing, or on the side opposite the cover of the casing, as desired.

The switch construction in the casing 10 may be any well known snap switch construction that is actuated by the inner end of the plunger 12. Such spring construction biases the plunger 12 outwardly, as is well known so that the plunger returns to its outermost position when released after being actuated inwardly.

The supporting bracket 14 may have an integral, sheet metal top supporting side arm 20, which may be integral with the supporting bracket 14, and substantially at right angle to the plane of the bracket 14. This arm 20 may extend over another side 21 of the switch 10 which side 21 may be adjacent to and at an angle to side 15. The angle between the bracket 14 and the arm 20 may correspond substantially to the angle between the casing sides 15 and 21. A pair of slots 22 may be formed in the arm 20. The slots 22 form a pair of upper bridges 24 and a lower bridge 26, with the lower bridge 26 having a dimple 28. An actuating blade 30 may have one end 32 inserted or telescoped through the slots 22, to form a mortised or bayonet joint. The blade 30 may have an opening 34, which may receive the dimple 28 and form locking means to hold the blade 30 in place. The blade 30 may be made of spring metal sheet material and may be held by the bridges 24 and 26, so that the blade does not downwardly actuate the plunger 12 by spring action. The blade 30 may have a plain end 34' which may be manually actuated, or actuated by any mechanism desired. However, the end 34' may, if desired, have a roller attached thereto, as is obvious. Alternatively, the bridges 24 may be the lower bridges and the bridge 26 may be the upper bridge. The blade 30 may have the dimple, and the cooperating bridge may have the opening, as is obvious.

In FIGURE 7 the blade 30A may be insertable in the arm 20 of the bracket 14 of FIGURE 3, but it may have an enlarged body portion 36 instead of the uniform width shown for the blade 30 in FIGURE 5. The right hand end of the blade 30A may be the end which is inserted in the arm 20 of bracket 14, of FIGURE 3.

In the embodiments of FIGURES 1–7, the support bracket 14 and its arm 20 may be made of a single sheet metal member of relatively rigid construction, which need not have any substantial resiliency. The blade 30, or 30A, on the other hand, may be slightly resilient, so that it can be resiliently pushed down manually or mechanically to actuate the plunger 12, as shown.

FIGURE 6 shows an embodiment in which the lower bridge member 26' is upwardly bowed to provide added pressure against the bottom of the blade 30. Otherwise, the embodiment of FIGURE 6 may be substantially identical to that of FIGURES 1–5 and 7.

FIGURE 8 shows a side supporting bracket 38, which may be functionally similar to bracket 14, and which may be provided with holes 40 similar to the holes 16 and 18 of FIGURES 1–5. The side of the bracket 38 which is adjacent to the switch is shown in elevation in FIGURE 8.

The support bracket 38 may have an arm 42 bent at an angle corresponding substantially to the angle between the sides of the casing, such as substantially at right angles to the plane of the bracket 38. The arm 42 may have an upper bridge 44 struck upwardly therefrom, which bridge may have downward dimple 46. The arm 42 may have a pair of slanting flanges 48, 48 at one end, and another pair of slanting flanges 50, 50 at the other end. The flanges 48 and 50 are adapted to receive and guide the edges of the end 52 of a spring blade 54, which blade 54 is functionally and physically similar to blade 30 heretofore described. The blade 54 may have an opening 56 adapted to receive the downward dimple 46 and to hold the blade 54 against longitudinal movement, after the blade has been inserted under the bridge 44. The flanges 48 and 50 prevent the blade 54 from rocking sidewise. If desired, in this and other embodiments, the dimple 46 and the hole 56 may be interchanged, with a hole being in the bridge 44 and the like and a dimple being at 56 in the blade 54 and the like.

In the embodiment of FIGURES 8–12, the blade 54 may be telescoped or inserted underneath the bridge 44 and over the main body of the flat arm 42, and may be held against sidewise rocking movement by the flanges 48, 50, to form a mortised or bayonet joint between the blade 54 and the arm 42.

In the embodiment of FIGURES 13 and 14, a side support bracket 58 may be functionally similar to the brackets 14 and 38 heretofore described, and may have screw receiving openings for attachment to the switch. The bracket 58 may have an arm 60 substantially at right angles to the plane of the bracket 58, and which arm 60 is to be placed over the top of the switch, in a similar manner to that shown in FIGURES 1 and 4. The arm 60 may have a dimple 62. The dimple 62 extends downwardly from the bracket arm 60. A spring blade 64, generally functionally similar to the blades 30, 30A, 54 heretofore described may have upper, parallel, longitudinal bridges 66 struck thereon. The bridges 66 have a sufficient offset from the main body of the blade 64, so that the blade 64 may be sidewise pushed, so that the bridges 66 telescope over the arm 60. A portion or lower intermediate bridge 68 of the main body of the blade 64, which is between the bridges 66, passes under the arm 60. This portion 68 may have an opening to receive the dimple 62, to lock the blade 64 in place. This provides a mortised or bayonet joint between the blade 64 and the arm 60.

In the embodiment of FIGURES 15 and 16, a side supporting bracket 70 may be substantially functionally similar to brackets 14, 38, 58. The bracket 70 may have an arm 72 somewhat functionally similar to the arm 42 of FIGURES 8–12, but without any bridge 44. The arm 72 has a pair of slanting flanges 74 at one end, and a pair of slanting flanges 76 at the other end, similar to pairs of flanges 48, 48 and 50, 50 of FIGURE 11. The spring blade 78, which may be functionally similar to the blades 30, 30A, 54, 64, may have a reversely bent end 80 with a U turn or bend at 82. The reversely bent end 80 may be hooked over and under the arm 72 of the bracket 70. The blade 78 may have a downward dimple 84, which may engage an opening in arm 72, not shown, to hold the blade 78 against longitudinal movement. As previously described, for all embodiments, the dimple 84 may be a hole, and a dimple may be placed on the arm 72, if desired. This provides a mortised or bayonet joint between the blade 78 and the arm 72.

In the embodiment of FIGURES 17 and 18, a side supporting bracket 86 may be functionally similar to the previously described brackets, and may be provided with one or more holes 88 as previously described. An integral side arm 90 may be integral with the supporting bracket 86, and may be at right angles to the plane of the bracket 86 substantially in the same manner as in the embodiments heretofore described. The arm 90 may be provided with a pair of ears 92, 92, each which is provided with an opening 94. An end flange 96 may be provided on the arm 90. An actuating blade 98, similar in function and construction to the spring blades 30, 30A, 54, 64, 78, may be provided. The blade 98 may form a swivel joint with the side arm. To this end, the blade 98 may be provided with a slot 100 to provide the arms 102 on each side of the slot 100. The arms 102 may be provided with outwardly directed flanges 104. The arms 102 may be pressed together and then the blade 98 may be placed over the platform or arm 90, with the flanges 104 telescoped in the openings 94. The end 106 may engage or be adjacent to the flange 96. The blade 98 may swivel about the openings 92 and may rest lightly on the plunger 12. The plunger 12 may be spring loaded outwardly sufficiently not to be actuated by the weight of the blade 98, but can be actuated by the blade 98 if such blade is manually or mechanicaly downwardly actuated.

In the embodiments of FIGURES 19 and 20, a supporting side bracket 108 may be provided, which may be functionally similar to the supporting bracket 86 heretofore described, and the bracket 108 may be provided with openings 110 similar to the openings 88 heretofore described. The bracket 108 may be provided with an integral arm 112 extending substantially at right angles to the plane of the bracket 108. The arm 112 may be provided with an upward flange 114 which has a horizontal slot 116 and an intersecting vertical slot 118 at right angles to each other. The actuating blade 120 may be similar in construction in function to the actuating blade 98 heretofore described. The blade 120 may be provided with a swivel joint with the arm 112. To this end, the blade 120 may be provided with a slot 122 similar to slot 100 heretofore described. The slot 122 forms arms 124 which have opposite notches 126 and opposite outward tongues 128. The arms 124 may be pressed together, to reduce the distance between the notches 126 sufficiently so that the notches 126 may be moved through the slot 118. The arms 124 may then be released so that the tongues 128 may be hooked beyond the ends of the slot 116. The blade 120 may swivel about the slot 116 as a fulcrum and may rest lightly on the plunger 10 similarly to blade 98.

In the embodiment of FIGURES 21 and 22 a side supporting sheet metal bracket 130 may be substantially similar to the brackets heretofore described and may be provided with one or more holes 132. A sheet metal arm 134 may be integral with the bracket 130, and may be at right angles to the plane of the bracket 130. The bracket 130 and the arm 134 may be substantially the same in function and construction as the bracket and arms heretofore described. The arm 134 may be provided with a horizontal and downward slot 136. A swivel joint may be provided between the blade 138 and the arm 134. To this end, the actuating blade 138 may be provided with a slot 140 functionally similar to slots 100 and 122. The blade 138 may be bent substantially at right angles to form a downward flange construction 142, which has opposite notches 144 and opposite outward tongues 146 substantially functionally similar to the notches 126 and the tongues 128 of FIGURE 20. The slot 140 forms arms 148, which may be pressed together, so that the tongues 146 may be inserted in the opening 136. The arms 148 may then be released, so that the notches 146 may engage the ends of the slot 136 and hold the blade 138 for engagement with the plunger of the switch, substantially in the same manner that the blade 30 engages the plunger 12.

The blade 138 may swivel about the slot 136 as a fulcrum and may rest lightly on an outwardly spring biased plunger functionally in the same manner as blades 98 and 120 heretofore described.

In the embodiment of FIGURE 23, the bracket 150 may be substantially the same as bracket 130, and the platform or arm 152 may be substantially the same as arm 134, except that two slots 154 may be provided in arm 152 so that the right angle portion 142 of the blade 138 may be inserted into either of the slots 154, to provide a blade of different effective lengths, with respect to the switch casing construction.

In the embodiment of FIGURES 24 and 25, the sheet metal bracket 156 may be substantially the same as the brackets heretofore described, and it may be provided with an integral sheet metal side arm 158 at right angles to the plane of the bracket 156. The bracket 156 may be attached to a switch construction similar to that shown in FIGURES 1 and 4.

A swivel joint may be provided between the arm 158 and the blade 166. To this end, the arm 158 may have an opening 160 stuck therein to form a pair of ears 162. The ears 162 may have openings or dimples 164. If they are dimples, they are inwardly directed. The actuating blade 166 may be provided with a slot 168 substantially the same in function and construction as the slots 100, 122, and 140 heretofore described. The slot 168 forms the arms 170 on each side of the slot 168. Each arm 170 may be provided with an ear 172. Each ear 172 may be provided with an opening or a dimple 174 as alternatively desired. The arms 170 may be pressed together, so that the dimples or openings 174 may engage with the dimples or openings 164, so that the actuating blade 166 may be rockingly attached or swiveled to the arm 158. If desired, the lower ends 176 of the ears 172 may be longer than the width of the opening 160, so that the lower ends 176 may engage the top surface of the arm 158 to provide a springlike support for the actuating blade 166. On the other hand, the ears 172 may be so shaped that the blade 166 may swivel freely about the dimples and openings 164, 174, and the blade 166 may rest lightly on the plunger functionally in the same manner as blades 98, 120 and 138. For example, the ears 176 may be made sufficiently narrow so that the bottom surface 176 does not engage the top surface of the arm 158. Alternatively the bottom surface 176 may be rounded, not shown, so that it does not engage the top surface of the arm 158.

In FIGURE 26 the blades 166A may be substantially the same as blade 166 except that the ears 172A may be provided with notches 178 to allow the blade 166A to rock upwardly freely to insure that the blade 166A is not spring biased downwardly against the switch plunger which may correspond to plunger 12 of FIGURE 1. A swivel joint is thus provided between the blade 166A and the arm 158.

As previously described, in many of the constructions, such as in FIGURES 17 through 26, the respective actuating blade may be merely pivotally supported on the respective arms of the brackets. The plunger upon which the blades 98, 120, 138, 166 and 166A may rest, which plunger may be similar to the plunger 12 of FIGURES 1 and 4, may have sufficient upward spring action, so that it can move the respective blades 98, 120, 138, 166 and 166A upwardly by the spring action of the plunger corresponding to 12, so that the blades need not have any spring action but only a swiveling action.

All of the herein disclosed supporting brackets may be made of sheet metal and may be integral with their respective sheet metal side arms.

While a right angle has been specifically described in all of the embodiments between the two adjacent sides of the switch casing and a corresponding right angle has been described between the brackets and the side arms, any suitable corresponding angles may be provided between the casing sides and the brackets and side arms, as previously described in connection with FIGURES 1–5.

It is thus to the seen that an improved actuator and switch construction have been provided.

While the form of the invention now preferred has been disclosed as required by the statutes, other forms may be used, all coming within the scope of the claims which follow.

What is claimed is:

1. In combination, an actuator and a switch having a casing with two adjacent casing sides substantially at an angle to each other and with a switch actuating plunger outwardly extending from one of said sides, said actuator comprising: a flat, sheet metal supporting bracket rigidly attached to one of said casing sides; a sheet metal supporting side arm integral with said bracket to extend over the other casing side from which said plunger extends; and a separate actuating blade to extend over said other casing side and over said plunger and secured to said side arm.

2. An actuator according to claim 1 in which said blade is secured by a mortised joint to said side arm.

3. An actuator according to claim 1 in which said blade is secured by a swivel joint with said side arm.

4. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which said side arm is provided with two slots and with upper and lower bridges formed at said slots, and one end of said blade is inserted into said slots with said bridges above the below said blade.

5. An actuator according to claim 4 in which one of said bridges and said end of said blade are provided with cooperating dimple and hole constructions to lock said blade against longitudinal movement.

6. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which said arm is provided with an upper bridge and with pairs of slanting flanges at both ends of said arm, and in which an end of said blade is inserted under said upper bridge and between said slanting flanges.

7. An actuator according to claim 6 in which said upper bridge and said end of said blade are provided with cooperating dimple and hole constructions.

8. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which an end of said blade is provided with a pair of longitudinal parallel bridges and an intermediate bridge, and in which said arm is telescoped sidewise between said bridges.

9. An actuator according to claim 8 in which one of said bridges and said arm have cooperating dimple and hole constructions to lock said blade against longitudinal movement.

10. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which said arm is provided with pairs of slanting tongues at both ends of said arm, and said blade has a reversely bent end hooked around said arm.

11. An actuator according to claim 10 in which said reversely bent end and said arm have cooperating dimple and hole constructions to lock said blade against longitudinal movement.

12. An actuator according to claim 1 in which said side arm has a pair of ears with holes in them, and said blade has a central slot forming a pair of arms, each arm having opposite outwardly directed flanges, and flanges being telescoped in said holes.

13. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which said side arm has an upward flange with a horizontal slot and an intersecting vertical slot at right angles to each other, and said blade has a central slot forming a pair of arms, each arm having opposite notches and opposite outward tongues with said tongues hooked beyond the ends of said horizontal slot.

14. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which said side arm has a horizontal downward slot, and said blade has a central slot forming a pair of arms and has a downward flange construction which has opposite notches and opposite outward tongues, which said flange construction inserted in said downward slot and with said notches engaging the ends of said downward slot.

15. An actuator according to claim 14 in which said side arm has two horizontal downward slots and said flange construction is insertable into either of said downward slots.

16. An actuator for a switch having a casing with two adjacent casing sides substantially at an angle to each other and with a switch actuating plunger outwardly extending from one of said sides, said actuator comprising: a flat, sheet metal supporting bracket to be attached to one of said casing sides; a sheet metal supporting side arm integral with said bracket to extend over the other casing side; and a separate actuating blade to extend over said other casing side and over said plunger and secured to said side arm, and in which said side arm has an opening with a pair of upward ears each having a dimple-hole locking construction, and said blade has a central slot at one end with a pair of downward ears each having a dimple-hole construction engaging said first named dimple-hole construction.

17. An actuator according to claim 16 in which said downward ears each has a notch at the outer lower edge of said downward ears.

References Cited by the Examiner

UNITED STATES PATENTS

| 769,715 | 9/1904 | Roth | 287—20 |
|---|---|---|---|
| 2,413,130 | 12/1946 | Aitken. | |
| 2,454,341 | 11/1948 | Repka | 74—99 X |
| 2,612,368 | 9/1952 | Ransome | 74—54 X |
| 2,817,725 | 12/1957 | Rochfort et al. | |

FOREIGN PATENTS

| 637,165 | 2/1962 | Canada. |
|---|---|---|
| 702,372 | 1/1965 | Canada. |
| 1,251,451 | 12/1960 | France. |

MILTON KAUFMAN, *Primary Examiner.*

D. H. THIEL, *Assistant Examiner.*